United States Patent [19]

Namba et al.

[11] Patent Number: 4,936,537
[45] Date of Patent: Jun. 26, 1990

[54] SEALING BODY FOR DOOR MIRROR AND DOOR MIRROR USING THE SAME

[75] Inventors: Hiroaki Namba; Masakazu Kubota; Osamu Suzuki, all of Aichi, Japan

[73] Assignees: Tokai Kogyo Kabushiki Kaisha; Kasei Kogyo Company, Ltd., both of Oobu; Honda Giken Kogyo, Tokyo, all of Japan

[21] Appl. No.: 271,875

[22] Filed: Nov. 16, 1988

[30] Foreign Application Priority Data

Jan. 21, 1988 [JP] Japan .............................. 63-6541[U]

[51] Int. Cl.⁵ .......................................... B60J 10/00
[52] U.S. Cl. .............................................. 248/475.1
[58] Field of Search ............ 248/544, 549, 466, 475.1, 248/476; 350/631, 632

[56] References Cited

U.S. PATENT DOCUMENTS 4,253,633  7/1988  Sakuma .
4,728,181  3/1988  Kakinuma .
4,732,463  3/1988  Mittelhauser .
4,759,620  3/1981  Takegawa .

FOREIGN PATENT DOCUMENTS 290233  11/1988  European Pat. Off. ............ 350/632
2735330  2/1979  Fed. Rep. of Germany ... 248/475.1
11936  1/1984  Japan ................................ 350/632

Primary Examiner—Ramon O. Ramirez
Assistant Examiner—Robert A. Olson
Attorney, Agent, or Firm—Oblon, Spivak, McClelland, Maier & Neustadt

[57] ABSTRACT

A sealing body for mounting a mirror to the outside of a front door of a passenger car and a door mirror using the sealing body. The sealing body is sandwiched between a door panel and a mirror pad boot, and consists of a seal frame and a sealing pad. The seal frame has frame portions and openings. The frame portions are in close contact with the mirror pad boot. The sealing pad has protruding portions fitted in the openings. The front end surfaces of the protruding portions are in close contact with the mirror pad boot.

10 Claims, 4 Drawing Sheets

SEALING BODY FOR DOOR MIRROR AND DOOR MIRROR USING THE SAME

BACKGROUND OF THE INVENTION

1. Field of the Invention

The present invention relates to a sealing body for installing a mirror on the outside of a front door of a passenger car or other vehicles. The invention also relates to a door mirror using such a sealing body.

2. Discussion of the Background

A conventional sealing body for a door mirror is shown in FIGS. 5 to 9 and held between a mirror pad boot 5 and a door panel 9 as shown in FIG. 9 to provide a seal between them.

The conventional sealing body is generally indicated by numeral 4 in FIG. 5. The sealing body 4 consists of a resilient body. The sealing body 4 has a main portion 40, and a projection 41 substantially at its center. The projection 41 protrudes toward the automobile body in the direction indicated by the arrow A, and has a recess 411. The projection 41 is designed to be fitted into a recess 31 formed in a seal cap 3 shown in FIG. 6. The recess 31 is formed substantially in the center of the body, indicated by numeral 30, of the cap 3. The cap 3 has an attachment portion 32 at its upper end. This attachment portion 32 is mounted to ends 92 of the door panel 9 (FIG. 9). The cap 3 has another attachment portion 33 at its lower end, the attachment portion 33 being capable of being bent upward. As shown in FIG. 7, the seal cap 3 has retaining holes 311 in the rear surface of the recess 31 to mount the whole door mirror. The recess 31 extends inwardly of the automobile body.

In operation, the conventional sealing body 4 is held between the mirror pad boot 5 and the door panel 9 as shown in FIG. 9. When the structure is assembled, the sealing body 4 is fitted into the recess 31 in the seal cap 3. Then, the sealing body 4 and the cap 3 as one body are forced between the boot 5 and the panel 9 and sealed. The boot 5 supports a mirror holder 7 which embraces the door mirror, indicated by numeral 6 in FIG. 9.

As shown in FIG. 8, the mirror pad boot 5 has an engaging portion substantially in the center of the attached end of the automobile body, or the top of FIG. 8. The engaging portion engages the recess 411 in the sealing body 4 and is mounted to the door panel 9. The engaging portion comprises a cylindrical protruding portion 51, a foot wall 52 formed at the side of the protruding portion 51, and a plurality of small cylinders 53 disposed around the protruding portion 51. The boot 5 has a frame 54 on its outer periphery for engagement with the sealing body 4. The boot 5 further includes a support 55 on the opposite side to the engaging portion or on the side installing a door mirror, indicated by the arrow B, to hold the mirror holder 7. As shown in FIG. 9, the mirror pad boot 5, the sealing body 4, and the seal cap 3 are together mounted to the ends 92 of the door panel 9 with screws or the like.

The conventional sealing body 4 constructed as described above has some disadvantages. As shown in FIG. 9, a gap 8 is formed, for example, between the sealing body 4 and the mirror pad boot 5. This gap produces a high pitched sound while the automobile is moving through the air. Also, if the gap 8 exists, the sealing body becomes less resistant to rain, and the adhesion to the boot deteriorates.

SUMMARY OF THE INVENTION

In view of the foregoing problems with the prior art techniques, it is an object of the invention to provide a sealing body which is for use with a door mirror and prevents a gap from being formed between the sealing body and a mirror pad boot to thereby offer good sealing performance.

It is another object of the invention to provide a door mirror using the sealing body described above.

The present invention provides a sealing body for use with a door mirror. The sealing body is held between a door panel on the body of an automobile and a mirror pad boot, and the door mirror is mounted to the door panel. The sealing body comprises a seal frame having frame portions and openings, the frame portions being in close contact with the mirror pad boot; and a sealing pad having protruding portions to be fitted in the openings in the seal frame, the front end surfaces of the protruding portions being in close contact with the mirror pad boot. The seal frame and the sealing pad are in close contact with each other.

The present invention further provides a door mirror mounted to an automobile door. The door mirror comprises a mirror; a mirror pad boot which holds the mirror on the front side thereof, the rear side of the mirror pad boot having a mount portion mounted to the door; and a sealing body mounted on the rear side of the mirror pad boot and consisting of a seal frame and a sealing pad, the seal frame having frame portions and openings, the frame portions being in close contact with the mirror pad boot, the sealing pad having protruding portions fitted in the openings in the seal frame, the front end surfaces of the protruding portions of the sealing pad being in close contact with the mirror pad boot.

In accordance with the invention, the seal frame is fabricated by molding or punching a sheet of rubber or plastic into a desired shape. The sealing pad is formed by molding or extruding urethane resin, vinyl chloride resin, or other synthetic resin. Preferably, the sealing pad is a porous resilient body, such as foamed urethane resin, to enhance the sealing property. The mirror pad boot is provided so that a mirror holder embracing the body of the mirror may be mounted to the boot. The boot is a support and is made from a metal, hard rubber, or synthetic resin. The openings in the seal frame receive the protruding portions of the sealing pad and prevent the seal frame and the sealing pad from being out of position when they are brought into close contact with each other. The protruding portions of the pad which are fitted in the openings in the seal frame press down the seal frame to prevent it from being moved out of position. The front end surfaces of the protruding portions of the pad are the heads of the sealing pad that close contact with the mirror pad boot.

Preferably, the seal frame and the sealing pad are hermetically stuck on each other via adhesive tape, adhesive, or other coupling means to bring them in close contact with each other.

In one feature of the invention, the sealing pad adjusts itself to the complex gap between the door panel and the mirror pad boot and maintains the seal between them. Since no gap is left between the sealing body and the mirror pad boot, no high pitched sound is produced when the automobile is breaking through the air in operation. Further, the sealing body is highly resistant to rain.

In another feature of the invention, when the seal frame and the sealing pad are stuck on each other and brought into close contact with each other, they make closer contact with each other. Also, the above-described advantages can be obtained.

Other objects and features of the invention will appear in the course of the description thereof which follows.

DESCRIPTION OF THE PREFERRED EMBODIMENTS

Referring to FIGS. 1 through 4, there is shown a sealing body embodying the concept of the invention. The sealing body which is for use with a door mirror is generally indicated by numeral 1. The sealing body 1 comprises a seal frame 10 and a sealing pad 20.

Figure 2:
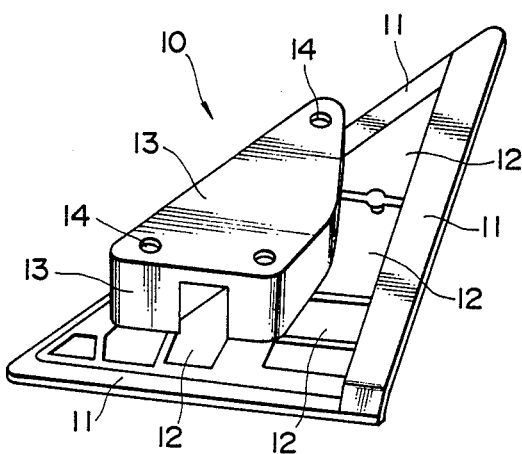
FIG. 2 is a perspective view of the seal frame shown in FIG. 1.

The seal frame 10 includes frame portions 11, openings 12, and a projection 13, as shown in FIG. 2. The frame portions 11 make close contact with the sealing pad 20 (FIG. 3) or a mirror pad boot 5 (FIG. 4). The frame portions 11 form the skeleton of the body of the seal frame 10 and is comprised of resilient sheets of rubber.

The openings 12 are surrounded by the frame portions 11. As described later, protruding portions 21 of the sealing pad 20 are inserted into the openings 12 and retained there. The seal frame 10 has a projection 13 substantially in the center of one side of the frame 10. This projection 13 protrudes into an inner panel 91 which is mounted in a door panel 9 on the inside of the automobile body as shown in FIG. 4. The projection 13 has a plurality of retaining holes 14 to mount a door mirror 6 through the sealing pad 20 etc.

Figure 3:
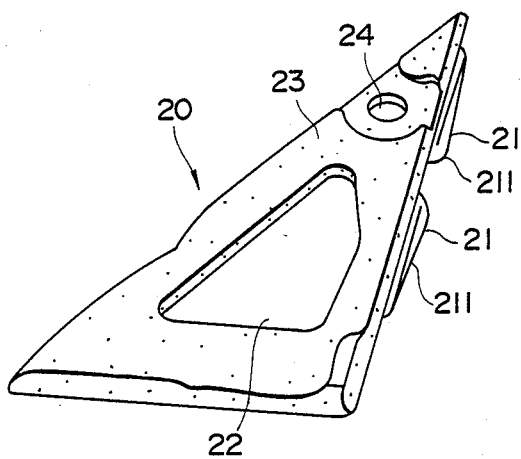
FIG. 3 is a perspective view of the sealing pad shown in FIG. 1.
Figure 4:
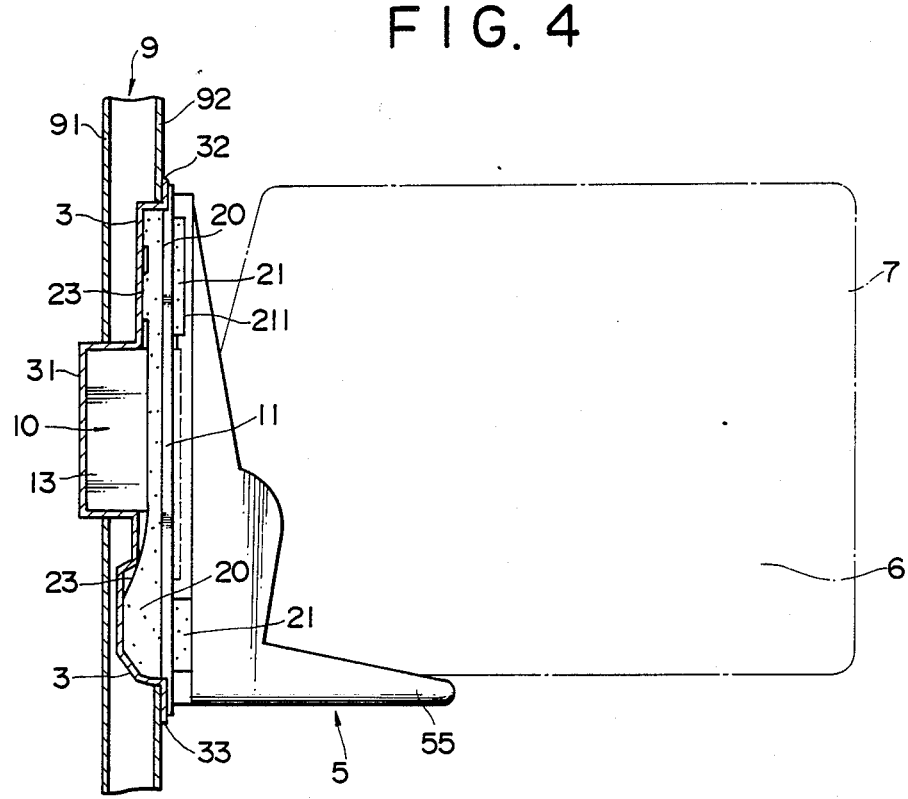
FIG. 4 is a partially cross-sectional view of the sealing body shown in FIG. 1 and a door panel to which the sealing body has been mounted.
Figure 6:
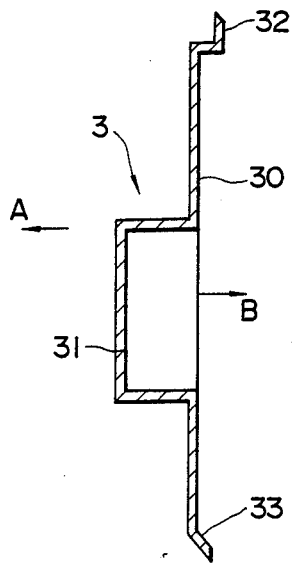
FIG. 6 is a cross-sectional view of a seal cap for use with the conventional sealing body shown in FIG. 5.
Figure 5:
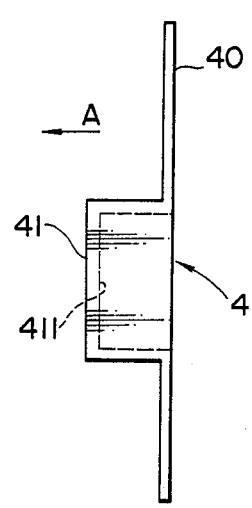
FIG. 5 is a side elevational view of a conventional sealing body.
Figure 7:
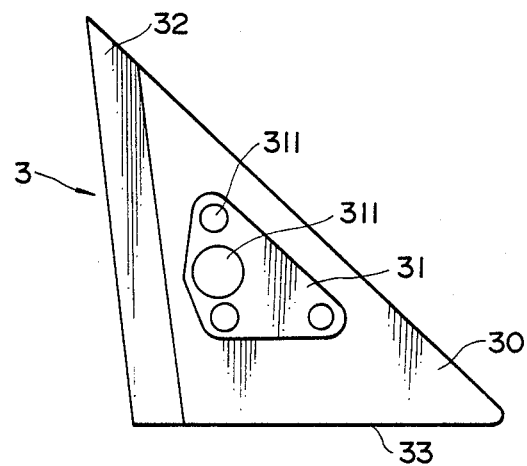
FIG. 7 is a rear elevational view of the seal cap shown in FIG. 6.
Figure 8:
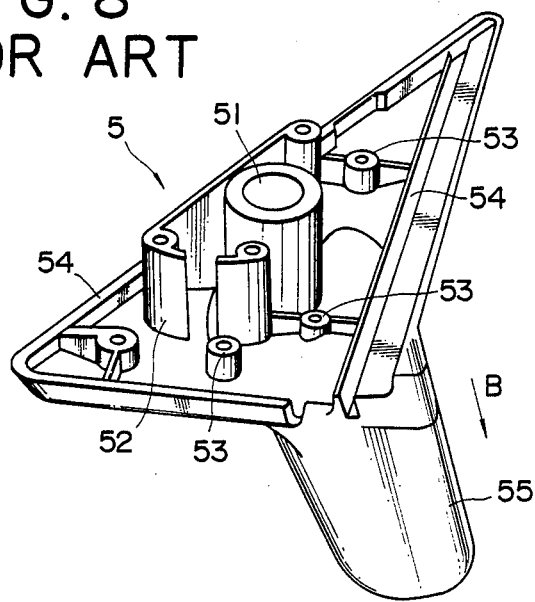
FIG. 8 is a perspective view of the rear side of a mirror pad boot for use with the seal cap shown in FIG. 7.
Figure 9:
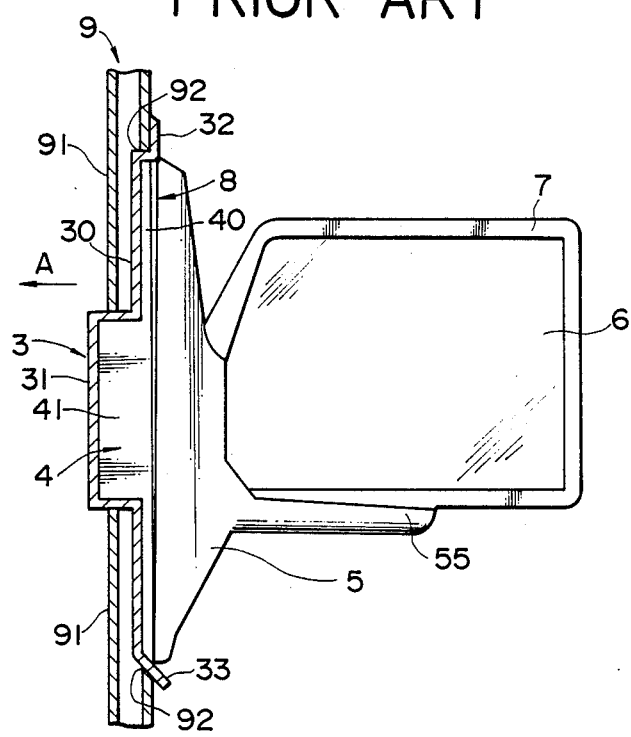
FIG. 9 is a partially cross-sectional view of the sealing body shown in FIG. 5 and a door panel to which the sealing body has been mounted.

As shown in FIG. 3, the sealing pad 20 is substantially centrally provided with a hole 22 into which the projection 13 of the seal frame 10 is fitted. The upper surface of the sealing pad 20 has a sealing contact surface 23 which faces toward the side B of the body 30 of the seal cap 3 (FIG. 6) already described in connection with the prior art techniques, the door mirror being mounted to the side B. The sealing pad 20 consists of foamed urethane resin. The sealing contact surface 23 of the sealing pad 20 has a substantially smooth skin of the foamed urethane resin. Thus, the contact surface 23 makes closer contact with the seal cap 3. The protruding portions 21 of the pad which are formed on the opposite side, i.e., the side at which the door mirror 6 is mounted, make close contact with the mirror pad boot 5. The front end surfaces 211 of the protruding portions 21 have substantially smooth skins of foamed urethane resin. As a result, the protruding portions 21 of the pad 20 make closer contact with the boot 5.

Figure 1:
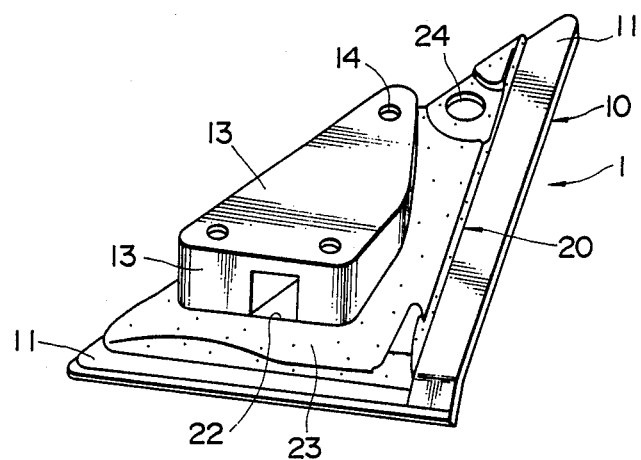
FIG. 1 is a perspective view of a sealing body according to the invention.

As shown in FIG. 1, in the sealing body 1, the sealing pad 20 is fitted into the seal frame 10, and they are stuck on each other through both-sided adhesive tape (not shown) so that they are kept in close contact with each other. The frame 10 and the pad 20 have holes 24 to permit them to be easily positioned relative to each other.

The novel sealing body is mounted in the manner described below. First, the seal cap 3 is fitted over the door panel 9, as shown in FIG. 4, in the same manner as in the prior art structure. Then, the seal frame 10 on which the sealing pad 20 has been stuck as described above is mounted on the seal cap 3. The mirror pad boot 5 is mounted on them. The assembly is fixed to the door panel 9 with screws. Under this condition, the projection 13 of the seal frame 10 is fitted in the recess 31 formed in the cap 3. The sealing contact surface 23 of the sealing pad 20 is in contact with the whole body 30 of the cap 3. The front end surfaces 211 of the protruding portions 21 on the rear side of the pad are in close contact with the boot 5.

As can be understood from the above description, in the novel door mirror, no gap is created between the sealing body 1 and the mirror pad boot 5 or the seal cap 3. Consequently, the novel sealing body prevents any screaming sound while the automobile is breaking through the air in running. Also, the sealing body is highly resistant to rain.

What is claimed is:

1. A sealing body for a door mirror, which sealing body is held between a door panel on the body of an automobile and a mirror pad boot, the door mirror being mounted to the door panel, said sealing body comprising:

a seal frame having frame portions and a plurality of openings, wherein said frame portions are adapted to be in close contact with said mirror pad boot; and a sealing pad having a plurality of protruding portions fitted in said openings in said seal frame, the front end surfaces of said protruding portions being adapted to be in close contact with said mirror pad boot, said seal frame and said sealing pad being in close contact with each other.

2. The sealing body according to claim 1, wherein said seal frame and said sealing pad are stuck together and in close contact with each other.

3. The sealing body according to claim 1, wherein said seal frame is made of rubber or plastic.

4. The sealing body according to claim 1, wherein said sealing pad comprises a porous resilient body of foamed urethane resin.

5. A door mirror mounted to an automobile door, comprising:

a mirror;

a mirror pad boot which holds said mirror on the front side thereof, the rear side of said mirror pad boot having a mount portion mounted to the door; and a sealing body mounted on the rear side of said mirror pad boot and consisting of a seal frame with a plurality of openings and a sealing pad, said seal frame having frame portions and openings, said frame portions being in close contact with said mirror pad boot, said sealing pad having a plurality of protruding portions fitted, respectively, in the openings in said seal frame, the front end surfaces of said protruding portions of said sealing pad being in close contact with said mirror pad boot.

6. The door mirror according to claim 5, wherein said seal frame and said sealing pad are coupled together in close contact with each other.

7. The door mirror according to claim 5, wherein said mirror pad boot, said seal frame, and said sealing pad are together fixed to the automobile door by the mount portion formed on the rear side of said mirror pad boot.

8. The door mirror according to claim 5, wherein a seal cap is put over the rear side of said sealing body and in close contact with said sealing pad.

9. The door mirror according to claim 8, wherein said mirror pad boot, said seal frame, said sealing pad, and said seal cap are coupled together with coupling members such as screws.

10. The door mirror according to claim 8, wherein said mirror pad boot, said seal frame, said sealing pad, and said seal cap are together fixed to the automobile door by the mount portion formed on the rear side of said mirror pad boot.

* * * * *